United States Patent [19]

Nitschke et al.

[11] Patent Number: 6,097,284
[45] Date of Patent: Aug. 1, 2000

[54] AIRBAG SYSTEM

[75] Inventors: Werner Nitschke, Ditzingen; Wolfgang Drobny, Heilbronn; Otto Karl, Leonberg-Höfingen, all of Germany

[73] Assignee: Robert Bosch GmbH, Stuttgart, Germany

[21] Appl. No.: 09/091,718

[22] PCT Filed: Dec. 11, 1996

[86] PCT No.: PCT/DE96/02376

§ 371 Date: Oct. 26, 1998

§ 102(e) Date: Oct. 26, 1998

[87] PCT Pub. No.: WO97/23369

PCT Pub. Date: Jul. 3, 1997

[30] Foreign Application Priority Data

Dec. 21, 1995 [DE] Germany ............... 195 47 840

[51] Int. Cl.[7] ....................................... B60Q 1/00
[52] U.S. Cl. ................ 340/436; 340/435; 340/903; 701/301; 280/728.1; 280/735
[58] Field of Search .................. 280/735, 728.1, 280/753; 340/903, 435, 436; 180/282; 701/301; 367/909

[56] References Cited

U.S. PATENT DOCUMENTS 5,646,454 7/1997 Mattes et al. .................... 307/10.1
5,904,723 5/1999 Kiribayashi et al. ................. 701/45

FOREIGN PATENT DOCUMENTS

| 0 283 737 | 9/1998 | European Pat. Off. . |
| 28 51 333 | 6/1980 | Germany . |
| 42 12 337 | 10/1993 | Germany . |
| 42 37 404 | 5/1994 | Germany . |
| 195 15 190 | 11/1995 | Germany . |
| 195 47 307 | 1/1997 | Germany . |

OTHER PUBLICATIONS

Bergfried et al. "Electronic Crash Sensors for Restraint Systems" Vehicle Electronics in the 90's, pp. 169–177 (1990).

Härtl et al. "Airbag Systems–Their Permanent Monitoring and Its Meaning to the User" Vehicle Electronics in the 90's, pp. 187–193 (1990).

1141 Ingenieurs de l'Automobile, No. 6, page 69ff. (1982)** No Month.

Primary Examiner—Daryl Pope
Attorney, Agent, or Firm—Kenyon & Kenyon

[57] ABSTRACT

Arranged in a triggering circuit of an airbag system are two switching elements which enclose a firing pellet. The switching elements are driven by way of assemblies and logic elements, respectively, in such a way that two separate criteria must be fulfilled for the transfer of each switching element into its conductive state.

9 Claims, 2 Drawing Sheets

AIRBAG SYSTEM

BACKGROUND INFORMATION

Airbag systems are known, for example, from the periodical 1141 Ingenieurs de l'Automobile (1982) No. 6, page 69 ff. and from German Published Patent Application No. 28 51 333 A1. In German Published Patent Application No. 28 51 333 A1, an airbag system is known in which provision is made in a triggering circuit for two switching elements that are controllable independently of one another. A firing current only acts upon a firing pellet arranged in the triggering circuit when both switching elements are being controlled conductively.

SUMMARY OF THE INVENTION

An object of the present invention is to provide an that achieves an increased performance reliability by avoiding false triggerings. This is of particular importance, given modem circuitry concepts with the use of microcomputers. In response to certain conditions, microcomputers are prone to uncontrolled states. These can be associated with unwanted control pulses for the final stages of the airbag system, which evoke the risk of falsely triggering the airbag. The present invention offers a design approach for avoiding this risk.

DETAILED DESCRIPTION

Figure 1:
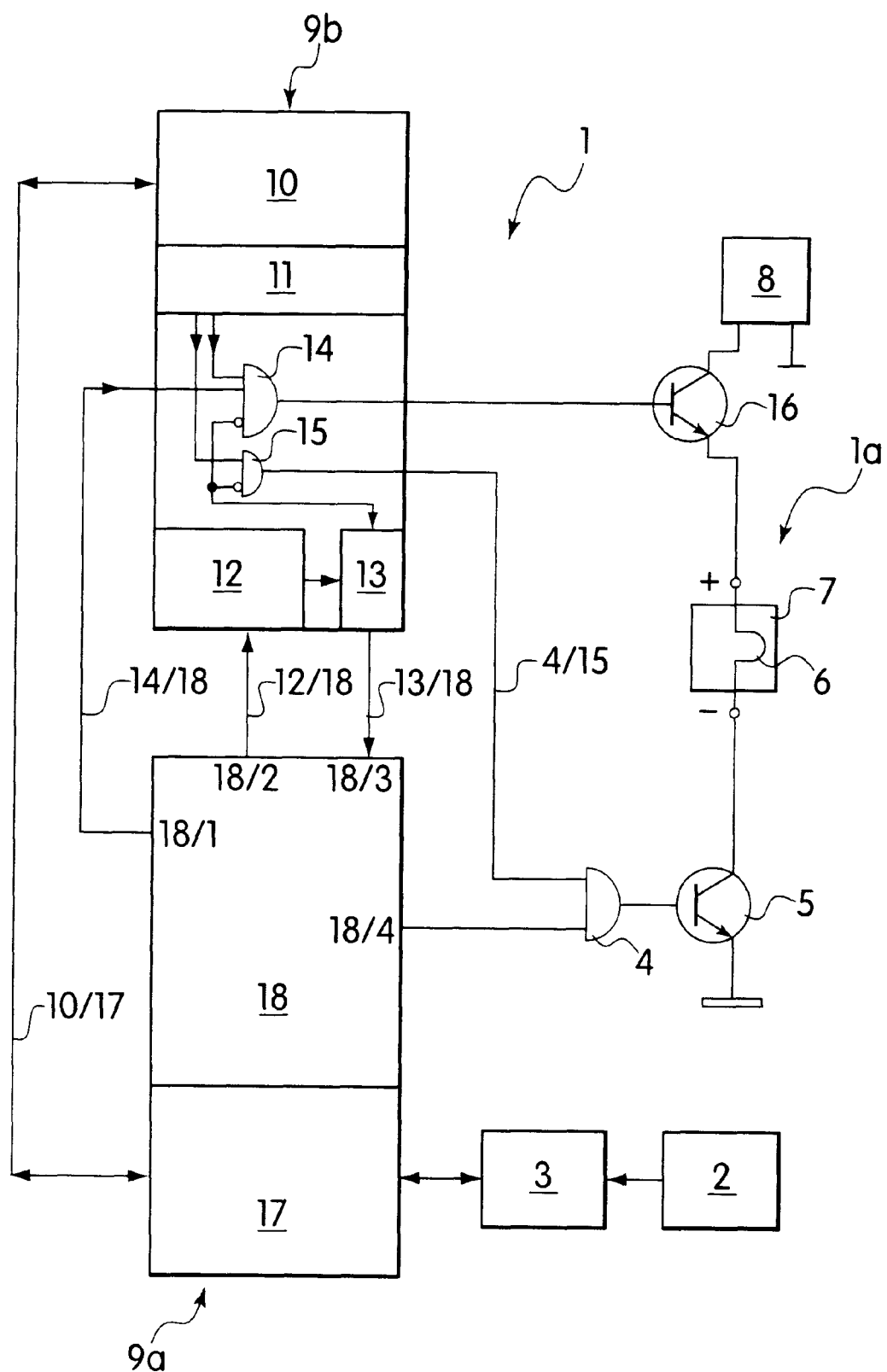
FIG. 1 shows a circuit diagram of an airbag system according to the present invention.
Figure 2:
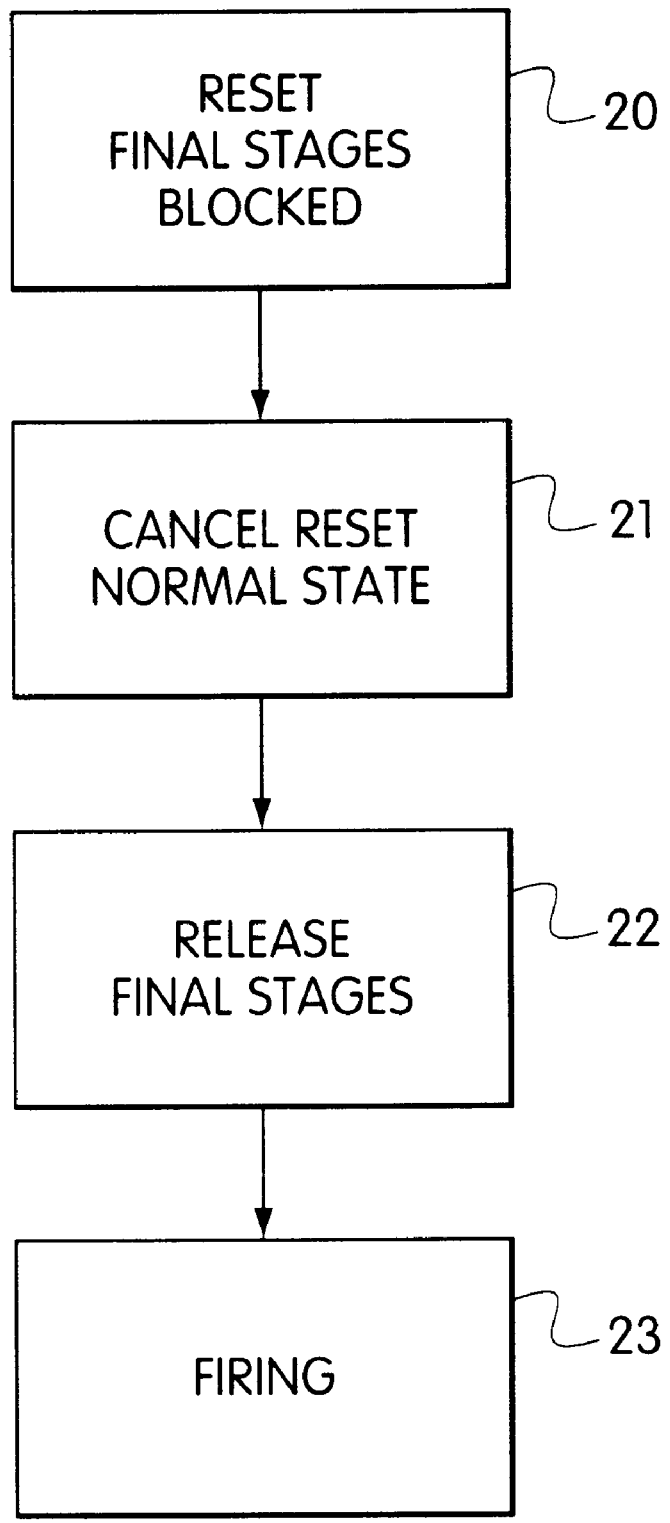
FIG. 2 shows a flow chart illustrating an operation of the airbag system of FIG. 1.

FIG. 1 shows the circuit diagram of an airbag system 1. It includes at least one sensor 2 that detects acceleration and is connected to a control unit 3. Control unit 3 is connected to assemblies 9a, 9b, which will be explained more precisely below. Airbag system 1 has at least one triggering circuit 1a for triggering a firing pellet 6. Firing pellet 6 is operatively connected to an airbag 7. Also arranged in triggering circuit 1a are two switching elements 5, 16 which enclose firing pellet 6 between them. A customary N-channel field-effect-transistor of higher performance having an SOT 223-housing is particularly well suited as switching element 5. A customary p-channel field-effect-transistor of higher performance having an SOT 223-housing is advantageously used as switching element 16. An energy source 8, usually the vehicle battery, is provided for the power supply of airbag system 1. In FIG. 1, only one connection of the energy source 8 to triggering circuit 1a is shown. For the sake of clarity, the necessary connecting lines to the remaining components of the airbag system have been left out. Assembly 9a is made up of a microcomputer. Suited as the microcomputer is, for example, the customary type HC 11, E 20, which, besides the usual further components, has in particular a serial interface 17 and, in a subassembly 18, a plurality of ports 18/1, 18/2, 18/3, 18/4. Assembly 9b includes a serial interface 10, a decoder 11, a watchdog circuit 12, a reset circuit 13, logic circuits 14, 15, as well as switching element 16 allocated to triggering circuit 1a. Connected to the gate terminal of switching element 5 is the output terminal of a logic element 4 that is provided with two input terminals. One input terminal each is connected to assemblies 9a, 9b. Assemblies 9a, 9b are interconnected via a plurality of connecting lines. Thus, line 10/17 connects serial interface 10, 17. Port 18/1 is connected via line 14/18 to an input terminal of logic element 14, whose output terminal is connected to the gate terminal of switching element 16. Port 18/2 is connected via line 12/18 to watchdog circuit 12. Port 18/3 is connected via line 13/18 to reset circuit 13. One input terminal each of logic elements 14, 15 are connected both to each other, and to reset circuit 13. A second input terminal of logic element 15 and a third input terminal of logic element 14 are connected in each case to decoder 11. According to step 20 of the flow chart shown in FIG. 2, switching elements 5, 16 of triggering circuit 1a are blocked by a reset signal of reset circuit 13. In this state, activation of firing pellet 6 is ruled out. Canceling the reset state transfers the airbag system 1 into the normal state, in which assemblies 9a, 9b are prepared for driving switching elements 5, 16. See step 21 in the flow chart according to FIG. 2. In a further step 22, switching elements 5, 16 are released for a future triggering process in such a way that one input terminal of logic element 14 receives a (static) control signal via port 18/1 and line 14/18, and logic element 4 receives a dynamic control signal via decoder 11, logic element 15 and line 4/15.

If, at this point, sensor 2 detects an acceleration pointing to an accident, and control unit 3, after evaluating the output signal of sensor 2, regards a triggering of airbag 7 as necessary, both switching elements 5, 16 are driven to close the triggering circuit. To that end, a static signal is applied via port 18/4 of subassembly 18 to the second input terminal of logic element 4, with the result that the gate terminal of switching element 5 receives a control signal via the output terminal of logic element 4. In this manner, switching element 5 is controlled into the conductive state. A control command in the form of a digital signal is simultaneously transmitted from serial interface 17, via line 10/17, to serial interface 10. This signal is decoded in decoder 11 and fed to the third input terminal of logic element 14. The gate terminal of switching element 16 thereupon receives a control signal via the output terminal of logic element 14, which has the result that switching element 16 switches through and triggering circuit 1a closes. Only at this point can current act upon firing pellet 6, and airbag 7 be activated. Therefore, the inventive design approach provides that each of switching elements 5, 16 must be driven in two different ways, in order to come into the conductive state. First of all, by a signal, which, because of the wiring in terms of hardware, of necessity brings about a specific circuit state. Secondly, by a coded software command, which is only generated in a strictly defined function range of the airbag system. In this context, the system is driven by essentially three main functions, which are executed cyclically in succession. These three main functions are:

1. Determine system state
   Preprocess sensor signal
   Calculate algorithm
   Define triggering commands (triggering state)
2. Implement triggering
   Execute triggering commands, i.e. release and drive switching elements
3. Program-execution control
   Program monitoring
   Operate watchdog Advantageously, the cycle duration is 500 microseconds to approximately 1 millisecond.

Only one driving state is possible per cycle. The release and the driving take place in separate states, i.e. in different program runs timewise. Thus, the program architecture prevents mistaken driving due to incorrectly entering into a program path. A calculation and program control are still carried out between the safety-relevant actions of release and driving.

This leads to the advantageous result that, in particular, even critical double errors in driving the switching elements cannot result in an unwanted triggering of the airbag. Since the dynamic driving process can only take place in a strictly defined function range of the system, in all other ranges, the airbag is not triggered, in spite of errors possibly occurring in the form of interference pulses. Consequently, the diversity, in terms of hardware, through static and dynamic driving increases the immunity to interference quite substantially.

What is claimed is:

1. An airbag system, comprising:
   at least one sensor;
   a control unit coupled to the at least one sensor;
   a first switching element coupled to the control unit;
   a second switching element coupled to the control unit; and
   at least one triggering circuit coupled to the first switching element and to the second switching element and including a firing pellet;
   wherein at least one airbag is coupled to the at least one triggering circuit, the at least one triggering circuit being closed when each one of the first switching element and the second switching element is driven, wherein a driving operation of the first switching element occurs when a first plurality of circuit states is satisfied, and wherein a driving operation of the second switching element occurs when a second plurality of circuit states is satisfied, the first plurality of circuit states being derived from a first set of criteria that is different from a second set of criteria from which the second plurality of circuit states is derived.

2. The airbag system according to claim 1, further comprising:
   a first logic element coupled to at least one of the first switching element and the second switching element;
   a first assembly coupled to at least one of the first switching element and the second switching element; and
   a second assembly coupled to at least one of the first switching element and the second switching element, wherein each one of the first plurality of circuit states and the second plurality of circuit states is based on at least one of:
      an interconnection existing among the first logic element, the first assembly, and the second assembly for driving the first switching element and the second switching element; and
      a superimposition of at least one software command generated within a defined function range of the airbag system.

3. The airbag system according to claim 2, wherein the first assembly and the second assembly are interconnected via a plurality of static line connections and at least one dynamic line connection.

4. The airbag system according to claim 2, wherein the first assembly includes a first serial interface, and wherein the second assembly includes a second serial interface.

5. The airbag system according to claim 4, wherein the second assembly includes:
   a decoder coupled to the second serial interface;
   a second logic element coupled to the decoder;
   a third logic element coupled to at least one of the decoder and the second logic element; and
   a reset circuit coupled to at least one of the second logic element and the third logic element.

6. The airbag system according to claim 5, wherein an output of the reset circuit is coupled to a first input of the second logic element and a first input of the third logic element, wherein the decoder is coupled to a second input of the second logic element and to a second input of the third logic element, and wherein a third input of one of the second logic element and the third logic element is coupled to a port of the first assembly.

7. The airbag system according to claim 5, wherein one of the first switching element and the second switching element is distant to ground, and wherein an output terminal of one of the second logic element and the third logic element is coupled to a gate terminal of the one of the first switching element and the second switching element that is distant to ground.

8. The airbag system according to claim 5, wherein one of the first switching element and the second switching element is close to ground, wherein an output terminal of the first logic element is connected to the one of the first switching element and the second switching element that is close to ground, wherein a first input of the first logic element is coupled to an output terminal of one of the second logic element and the third logic element, and wherein a second input of the first logic element is coupled to a port of the first assembly.

9. The airbag system according to claim 5, wherein:
   the second assembly includes a watchdog circuit coupled to the reset circuit;
   at least one dynamic line connection couples the first serial interface to the second serial interface;
   a first static line connection couples a first port of the first assembly to the watchdog circuit;
   a second static line connection couples a second port of the first assembly to the reset circuit; and
   a third static line connection couples a third port of the first assembly to an input of one of the second logic element and the third logic element.

* * * * *

UNITED STATES PATENT AND TRADEMARK OFFICE
CERTIFICATE OF CORRECTION

PATENT NO. : 6,097,284
DATED : August 1, 2000
INVENTOR(S) : Nitschke et al.

Page 1 of 1

It is certified that error appears in the above-identified patent and that said Letters Patent is hereby corrected as shown below:

Column 1,
Line 18, change "... an that..." to -- an airbag system that --.
Line 21, change"... modem ..." to -- modern --.

Signed and Sealed this

Twenty-fifth Day of September, 2001

Attest:

*Nicholas P. Godici*

NICHOLAS P. GODICI
*Attesting Officer*  *Acting Director of the United States Patent and Trademark Office*